US012629617B2

(12) United States Patent
Kuroda et al.

(10) Patent No.: US 12,629,617 B2
(45) **Date of Patent: *May 19, 2026**

(54) CHEMICAL SOLUTION SUPPLY SYSTEM AND CHEMICAL SOLUTION SUPPLY METHOD

(71) Applicant: Kioxia Corporation, Tokyo (JP)

(72) Inventors: Yuichi Kuroda, Yokkaichi Mie (JP); Toshiyuki Muranaka, Yokkaichi Mie (JP)

(73) Assignee: KIOXIA CORPORATION, Tokyo (JP)

( * ) Notice: Subject to any disclaimer, the term of this patent is extended or adjusted under 35 U.S.C. 154(b) by 1282 days.

This patent is subject to a terminal disclaimer.

(21) Appl. No.: 17/410,793

(22) Filed: Aug. 24, 2021

(65) Prior Publication Data

US 2022/0062804 A1 Mar. 3, 2022

(30) Foreign Application Priority Data

Aug. 25, 2020 (JP) ................................. 2020-141494

(51) Int. Cl.
B01D 35/143 (2006.01)
B01D 29/11 (2006.01)
(Continued)

(52) U.S. Cl.
CPC ............ B01D 35/143 (2013.01); B01D 29/11 (2013.01); B01D 29/60 (2013.01); B01D 35/1573 (2013.01); B01F 23/40 (2022.01); B01F 35/187 (2022.01); B01F 35/71805 (2022.01); *B01F 2101/58* (2022.01)

(58) Field of Classification Search
CPC  B01D 35/1435; B01D 35/1475; B01D 35/26; B01D 35/143; B01D 35/147; B01D 35/1573; B01D 35/00; B01D 35/157; B01D 29/56; B01D 29/603; B01D 29/60; B01D 29/52; B01D 29/11; B01D 37/04; B01D 24/16; B01D 24/48; B01D 2201/54;
(Continued)

(56) References Cited

U.S. PATENT DOCUMENTS

2017/0340995 A1* 11/2017 Aida ................... H01L 21/0206
2019/0144301 A1* 5/2019 Branum .................. G07F 13/00
210/739

FOREIGN PATENT DOCUMENTS

JP        2017-212373 A        11/2017

OTHER PUBLICATIONS

US Final Office Action for U.S. Appl. No. 17/407,618 dated Jan. 18, 2024 (22 pages).
(Continued)

*Primary Examiner* — Akash K Varma
(74) *Attorney, Agent, or Firm* — Foley & Lardner LLP

(57) ABSTRACT
A chemical solution supply system including: a first tank that stores a first chemical solution; a first pipe that is connected to the first tank and conveys the first chemical solution; a first filter unit that is connected to the first pipe and has a first filter through which the first chemical solution is filtered; a first valve that is provided in the first pipe between the first tank and the first filter unit; a second tank that stores a second chemical solution; and a second pipe that is connected to the second tank and the first pipe between the first filter unit and the first valve.

14 Claims, 6 Drawing Sheets

(51) Int. Cl.
| | |
|---|---|
| *B01D 29/60* | (2006.01) |
| *B01D 35/157* | (2006.01) |
| *B01F 3/08* | (2006.01) |
| *B01F 15/00* | (2006.01) |
| *B01F 15/02* | (2006.01) |
| *B01F 23/40* | (2022.01) |
| *B01F 35/00* | (2022.01) |
| *B01F 35/71* | (2022.01) |
| *B01F 101/58* | (2022.01) |

(58) Field of Classification Search
CPC .. B01F 35/187; B01F 35/71805; B01F 23/40;
B01F 2101/58
USPC ........................................................ 210/739
See application file for complete search history.

(56) References Cited

OTHER PUBLICATIONS

Non-Final Office Action in U.S. Appl. No. 17/407,618 dated Sep. 29, 2023.

* cited by examiner

*FIG. 1*

CHEMICAL SOLUTION SUPPLY SYSTEM AND CHEMICAL SOLUTION SUPPLY METHOD

CROSS-REFERENCE TO RELATED APPLICATION

This application is based upon and claims the benefit of priority from Japanese Patent Application No. 2020-141494, filed Aug. 25, 2020, the entire contents of which are incorporated herein by reference.

FIELD

An embodiment described herein relates generally to a chemical solution supply system and a chemical solution supply method.

BACKGROUND

Various chemical solutions are used in a manufacturing process of a semiconductor device. In general, since foreign matters are mixed in a chemical solution in the manufacturing process, a conveying process, or the like, a filter unit having a filter for removing such foreign matters is attached to a pipe for conveying the chemical solution.

DESCRIPTION OF THE DRAWINGS

FIG. 1 is a schematic diagram of a chemical solution supply system of an embodiment.

DETAILED DESCRIPTION

Figure 2:
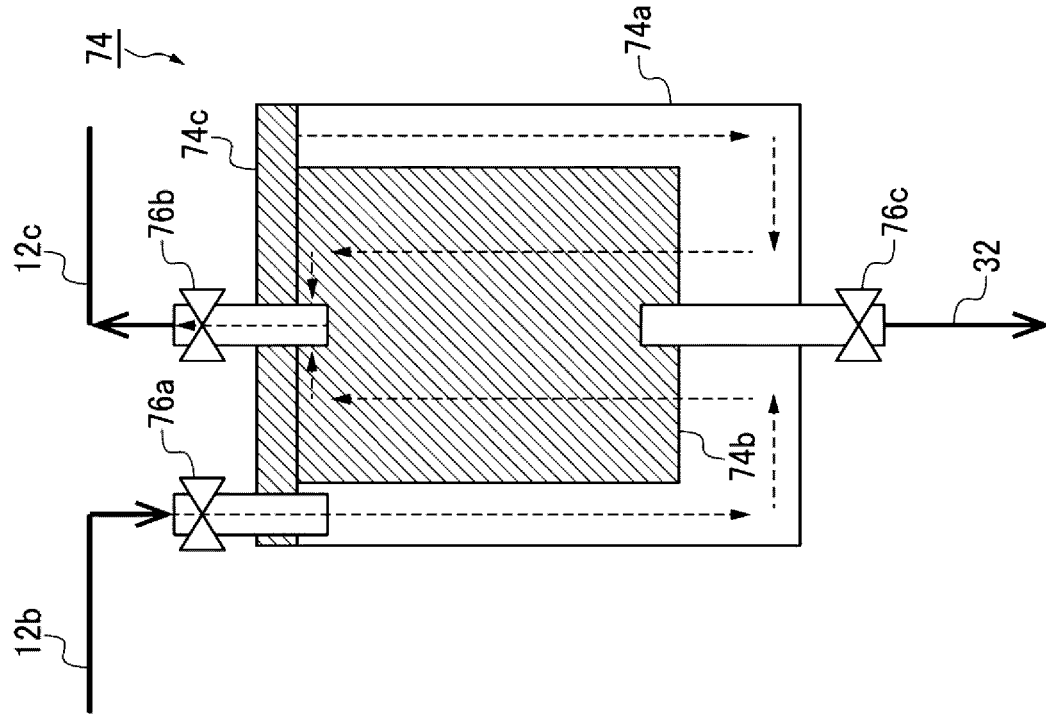
FIG. 2 is a schematic diagram of a filter unit of the embodiment.
Figure 2:
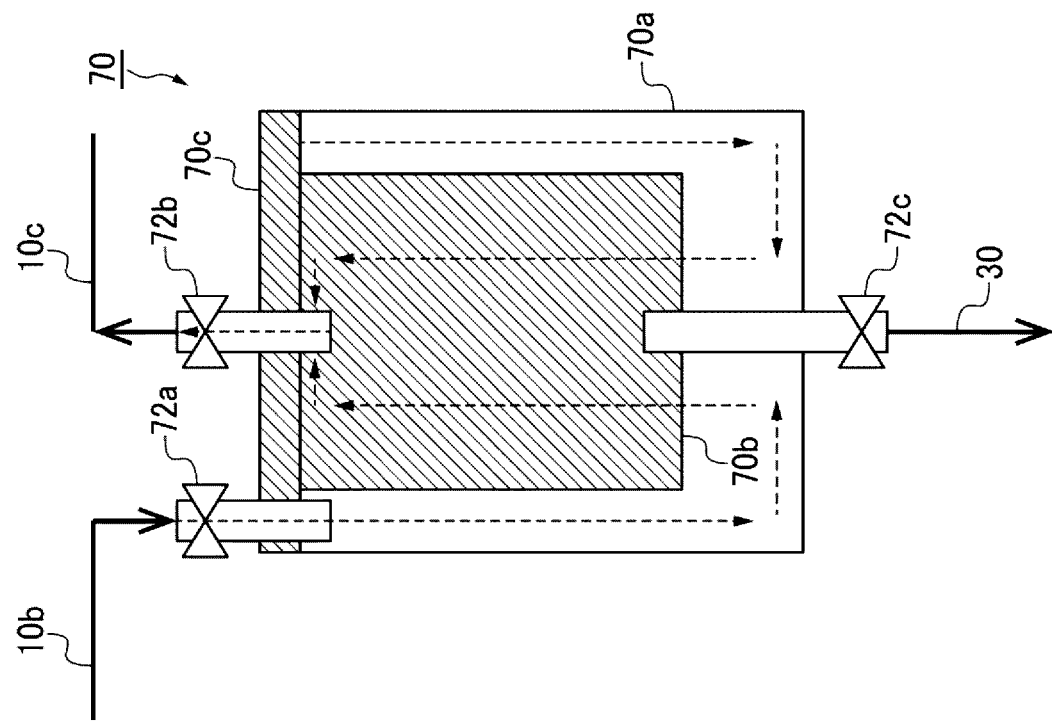

At least one embodiment provides a chemical solution supply system and a chemical solution supply method in which a filter can be safely used.

In general, according to at least one embodiment, there is provided a chemical solution supply system including: a first tank that stores a first chemical solution; a first pipe that is connected to the first tank and conveys the first chemical solution; a first filter unit (arrangement) that is connected to the first pipe and has a first filter through which the first chemical solution is filtered; a first valve that is provided in the first pipe between the first tank and the first filter unit; a second tank that stores a second chemical solution; and a second pipe that is connected to the second tank and the first pipe between the first filter unit and the first valve.

Hereinafter, an embodiment will be described with reference to the drawings. In the drawings, the same or similar portions are designated by the same or similar reference numerals.

Embodiment

The chemical solution supply system of at least one embodiment includes: a first tank that stores a first chemical solution; a first pipe that is connected to the first tank and conveys the first chemical solution; a first filter unit that is connected to the first pipe and has a first filter through which the first chemical solution is filtered; a first valve that is provided in the first pipe between the first tank and the first filter unit; a second tank that stores a second chemical solution; and a second pipe that is connected to the second tank and the first pipe between the first filter unit and the first valve.

A chemical solution supply method of at least one embodiment includes: supplying a first chemical solution from a first tank that stores a first chemical solution to a first filter unit that has a first filter through which the first chemical solution is filtered via a first pipe; closing a first valve that is provided in the first pipe between the first tank and the first filter unit; supplying a second chemical solution from a second tank that stores the second chemical solution to the first filter unit via the second pipe connected to the second tank and the first pipe between the first filter unit and the first valve, and the first pipe; monitoring a state of a liquid in the first filter unit; and determining a state of the first filter based on the monitoring.

Figure 1:
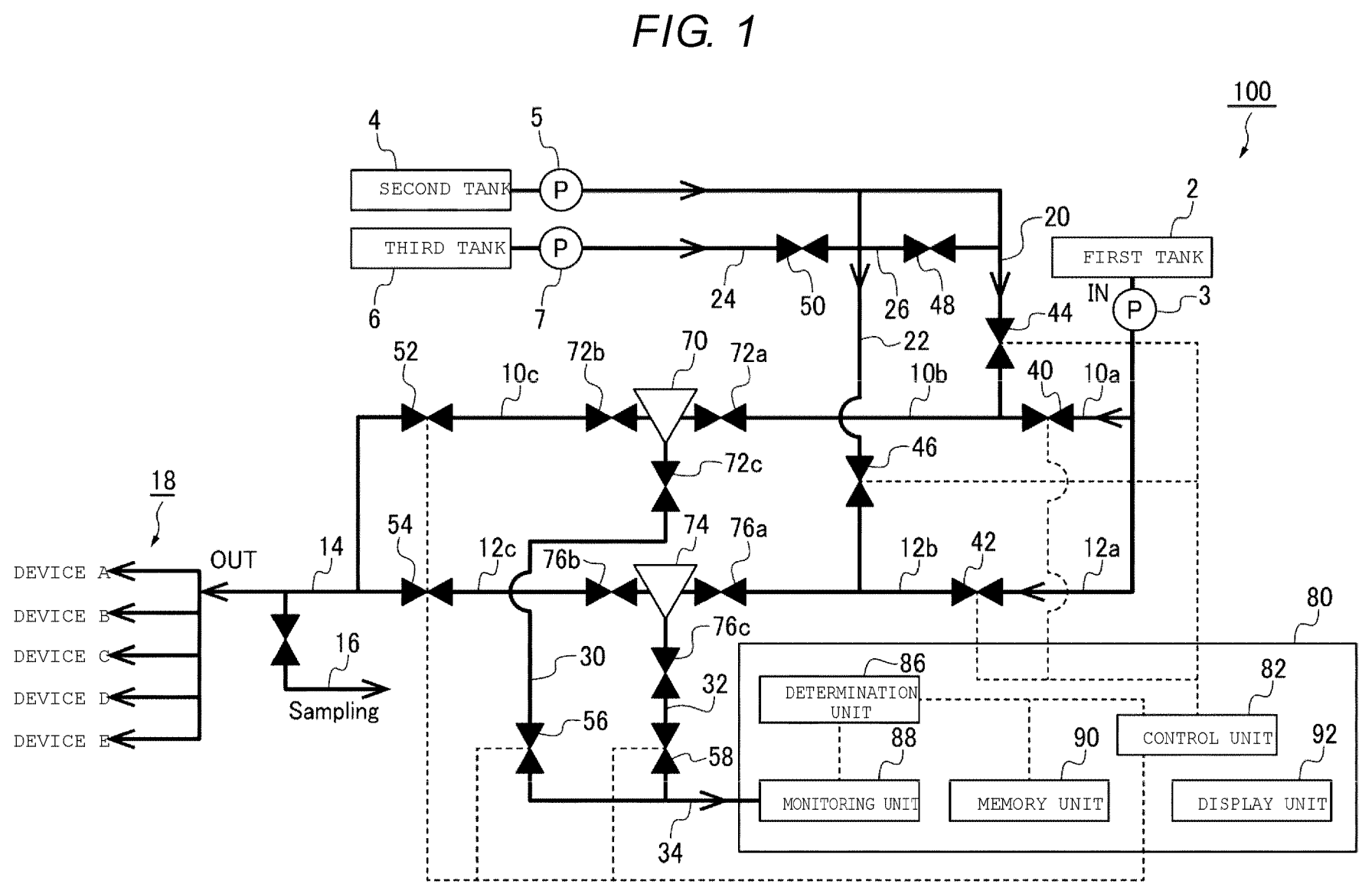
Figure 3:
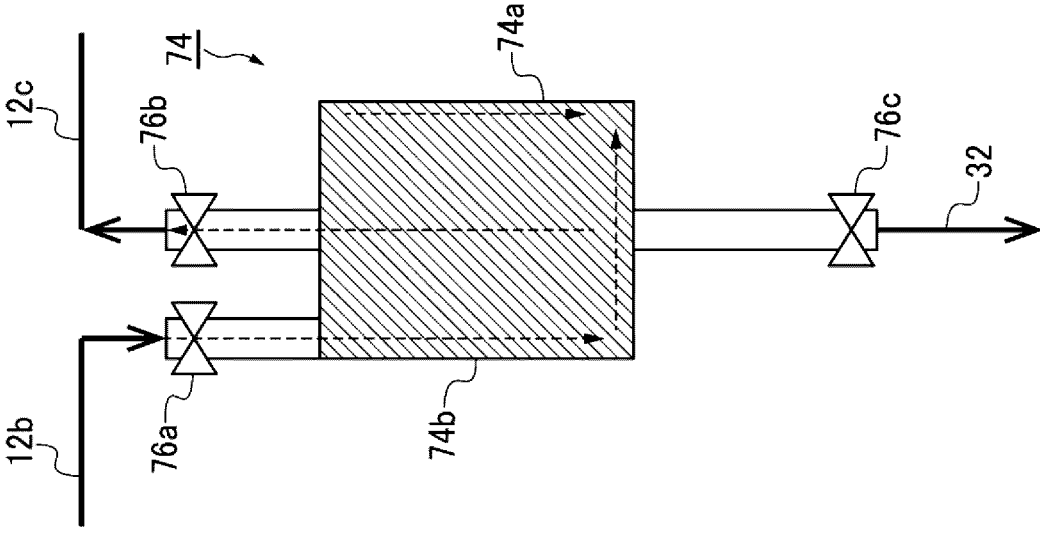
FIG. 3 is a schematic diagram of another aspect of the filter unit of the embodiment.
Figure 3:
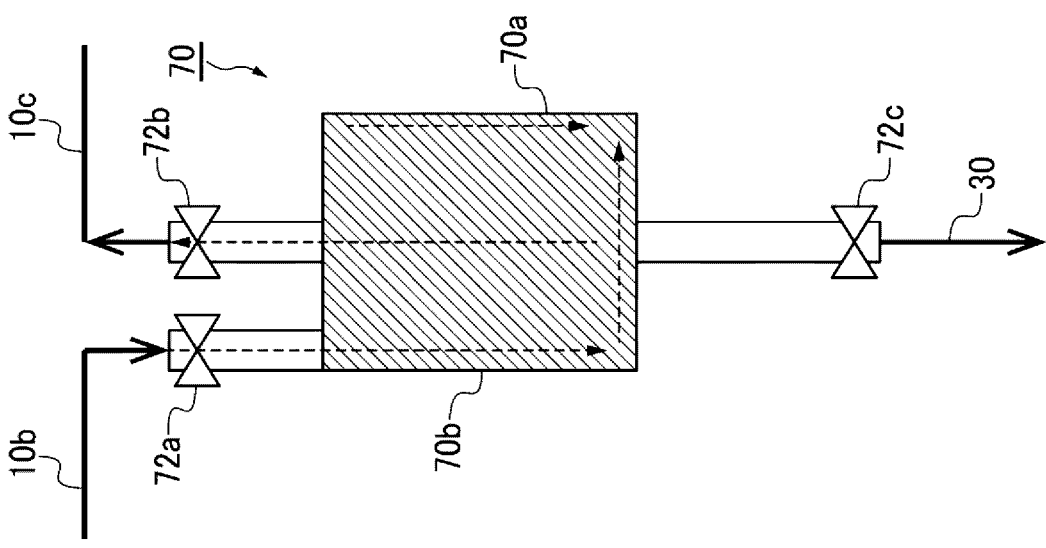

FIG. 1 is a schematic diagram of the chemical solution supply system of an embodiment. FIG. 2 is a schematic diagram of the filter unit of the embodiment. FIG. 3 is a schematic diagram of a filter unit of another aspect of the embodiment.

A chemical solution supply system 100 of the embodiment will be described with reference to FIGS. 1 and 2.

The chemical solution supply system 100 includes a first tank 2, a second tank 4, a third tank 6, a first pipe 10, a second pipe 12, a third pipe 14, and a fourth pipe 16, a fifth pipe 18, a sixth pipe 20 (an example of the second pipe), a seventh pipe 22, an eighth pipe 24, a ninth pipe 26 (an example of the third pipe), a tenth pipe 30, an eleventh pipe 32, a twelfth pipe 34, a first valve 40, a second valve 42, a third valve 44, a fourth valve 46, a fifth valve 48, a sixth valve 50, a seventh valve 52, an eighth valve 54, a ninth valve 56, a tenth valve 58, a first filter unit 70, a first filter unit connection valve 72a, a second filter unit connection valve 72b, a third filter unit connection valve 72c, a second filter unit 74, a fourth filter unit connection valve 76a, a fifth filter unit connection valve 76b, a sixth filter unit connection valve 76c, and a control device 80.

The control device 80 includes a control unit 82, a determination unit 86, a monitoring unit 88, a memory unit 90, and a display unit 92.

The chemical solution supply system 100 supplies a chemical solution, for example, to semiconductor manufacturing devices shown as "device A", "device B", "device C", "device D", and "device E" in FIG. 1. The semiconductor manufacturing device may be, for example, a wet cleaning device or a photolithography device for a semiconductor wafer, but the present disclosure is not limited thereto.

Each of the first tank 2, the second tank 4, and the third tank 6 is a tank that stores a chemical solution inside thereof. For example, the first tank 2 is a tank that stores a first chemical solution. For example, the second tank 4 is a tank that stores a second chemical solution for diluting the first chemical solution. For example, the third tank 6 is a tank that stores a third chemical solution for neutralizing the first chemical solution.

Here, for example, if the first chemical solution is a chemical solution containing hydrochloric acid (HCl) or sulfuric acid ($H_2SO_4$), for example, the second chemical solution is de-ionized water ((DIW): ultrapure water), for example, the third chemical solution is an sodium hydroxide (NaOH) aqueous solution.

Further, for example, if the first chemical solution is an ammonia ($NH_3$) aqueous solution, for example, the second chemical solution is de-ionized water ((DIW): ultrapure water), and, for example, the third chemical solution is acetic acid ($CH_3COOH$).

The combination of the first chemical solution, the second chemical solution, and the third chemical solution is not limited to the above description.

The first pipe 10 and the second pipe 12 are connected to the first tank 2.

FIG. 1 shows a first pipe 10a, a first pipe 10b, and a first pipe 10c as the first pipe 10. The first valve 40 is connected between the first pipe 10a and the first pipe 10b. The first filter unit 70 is connected between the first pipe 10b and the first pipe 10c.

A first pump 3 is provided in the first pipe 10a between the first valve 40, the second valve, 42 and the first tank 2 in order to supply or send the first chemical solution. Further, a second pump 5 is provided in the sixth pipe 20 between the third valve 44 and the second tank 4 in order to supply or send the second chemical solution. Further, a third pump 7 is provided in the eighth pipe 24 between the sixth valve 50 and the third tank 6 in order to supply or send the third chemical solution.

A schematic diagram of the non-cartridge type first filter unit 70 is shown on a left side of FIG. 2. The first filter unit 70 includes a first container 70a, a first filter 70b provided in the first container 70a, a first lid 70c, a first filter unit connection valve 72a, a second filter unit connection valve 72b, and a third filter unit connection valve 72c. The first filter unit connection valve 72a is connected to the first pipe 10b. The second filter unit connection valve 72b is connected to the first pipe 10c. The third filter unit connection valve 72c is connected to the tenth pipe 30. The third filter unit connection valve 72c is provided, for example, as a drain for removing bubbles and the chemical solution generated after the chemical solution passes through the first filter unit 70 from an inside of the first filter unit 70. When the first filter 70b is replaced, the first lid 70c is opened, the first filter 70b is taken out from the first container 70a, a new first filter 70b is put in the first container 70a. The first lid 70c is then tightened. The first chemical solution enters the first container 70a from the first pipe 10b via the first filter unit connection valve 72a. The first chemical solution that entered the first container 70a is filtered by the first filter 70b, for example, through routes as shown by dotted lines. After that, the first chemical solution is supplied to the first pipe 10c via the second filter unit connection valve 72b.

A schematic diagram of the cartridge type first filter unit 70 is shown on a left side of FIG. 3. The cartridge type first filter unit 70 has the first filter 70b inside the first container 70a. However, the first filter unit 70 does not have the first lid 70c. Thus, the first container 70a and the first filter 70b are integrated, and when the first filter 70b is replaced, the first filter unit 70 is replaced also.

Further, FIG. 1 shows a second pipe 12a, a second pipe 12b, and a second pipe 12c as the second pipe 12. The second valve 42 is connected between the second pipe 12a and the second pipe 12b. The second filter unit 74 is connected between the second pipe 12b and the second pipe 12c.

A schematic diagram of the non-cartridge type second filter unit 74 is shown on a right side of FIG. 2. The second filter unit 74 includes a second container 74a, a second filter 74b provided in the second container 74a, a second lid 74c, the fourth filter unit connection valve 76a, the fifth filter unit connection valve 76b, and the sixth filter unit connection valve 76c. The fourth filter unit connection valve 76a is connected to the second pipe 12b. The fifth filter unit connection valve 76b is connected to the second pipe 12c. The sixth filter unit connection valve 76c is connected to the eleventh pipe 32. The sixth filter unit connection valve 76c is provided, for example, as a drain for removing bubbles and the chemical solution generated after the chemical solution passes through the second filter unit 74 from the inside of the second filter unit 74. When the second filter 74b is replaced, the second lid 74c is opened, the second filter 74b is taken out from the second container 74a, a new second filter 74b enters the second container 74a, and the second lid 74c is tightened. The first chemical solution enters the second container 74a from the second pipe 12b via the fourth filter unit connection valve 76a. The first chemical solution that entered the second container 74a is filtered by the second filter 74b, for example, through a route as shown by dotted lines. After that, the first chemical solution is supplied to the second pipe 12c via the fifth filter unit connection valve 76b.

A schematic diagram of the cartridge type second filter unit 74 is shown on a right side of FIG. 3. The cartridge type second filter unit 74 has the second filter 74b inside the second container 74a. However, the second filter unit 74 does not have the second lid 74c. Thus, the second container 74a and the second filter 74b are integrated, and when the second filter 74b is replaced, the second filter unit 74 is replaced together.

The seventh valve 52 is connected between the first pipe 10c and the third pipe 14. Further, the eighth valve 54 is connected between the second pipe 12c and the third pipe 14. The third pipe 14 is connected to the fifth pipe 18. Through the fifth pipe 18, the first chemical solution is supplied to the semiconductor manufacturing devices shown as "device A", "device B", "device C", "device D", and "device E".

The fourth pipe 16 is connected to the third pipe 14. The fourth pipe 16 is a pipe provided for extracting and inspecting a part of the first chemical solution supplied to the semiconductor manufacturing device.

The sixth pipe 20 has the third valve 44 and is connected to the second tank 4 and the first pipe 10b between the first filter unit 70 and the first valve 40. The second tank 4 can supply the second chemical solution to the first pipe 10b via the sixth pipe 20 when the third valve 44 is opened.

The seventh pipe 22 has the fourth valve 46 and is connected to the second tank 4 and the second pipe 12b between the second filter unit 74 and the second valve 42. The second tank 4 can supply the second chemical solution to the second pipe 12b via the seventh pipe 22 when the fourth valve 46 is opened.

The eighth pipe 24 has the sixth valve 50 and is connected to the third tank 6 and the seventh pipe 22. Therefore, the eighth pipe 24 is connected to the second pipe 12b via the seventh pipe 22 (a part of the seventh pipe 22). That is, the third tank 6 is connected to the second pipe 12b via the eighth pipe 24 and the seventh pipe 22. Then, when the sixth valve 50 and the fourth valve 46 are opened, the third tank 6 can supply the third chemical solution to the second pipe 12b via the eighth pipe 24 and the seventh pipe 22.

The ninth pipe 26 has the fifth valve 48 and is connected to the third tank 6 via the eighth pipe 24. Further, the ninth pipe 26 is connected to the sixth pipe 20. Therefore, the ninth pipe 26 is connected to the first pipe 10b via the sixth pipe 20 (a part of the sixth pipe 20). That is, the third tank 6 is connected to the first pipe 10b via the eighth pipe 24, the ninth pipe 26, and the sixth pipe 20. Then, in the third tank 6, when the sixth valve 50, the fifth valve 48, and the third valve 44 are opened, the third chemical solution can be supplied to the first pipe 10b via the eighth pipe 24, the ninth pipe 26, and the sixth pipe 20.

The tenth pipe 30 is connected to the third filter unit connection valve 72c and supplies the chemical solution in the first filter unit 70 to the control device 80. The tenth pipe 30 is provided with the ninth valve 56.

The eleventh pipe 32 is connected to the sixth filter unit connection valve 76c and supplies the chemical solution in the second filter unit 74 to the control device 80. The eleventh pipe 32 is provided with the tenth valve 58.

The monitoring unit 88 measures characteristics of the chemical solution in the first filter unit 70 and the liquid (chemical solution) in the second filter unit 74. Therefore, the monitoring unit 88 can monitor states of the first filter 70b and the second filter 74b. The monitoring unit 88 has, for example, a concentration measurement monitor. Further, the monitoring unit 88 has, for example, a pH monitor. Further, the monitoring unit 88 has, for example, an ion sensor of a neutralizing salt generated by neutralization of the first chemical solution and the third chemical solution. Here, as the ion sensor, for example, when sodium ions are generated from the neutralizing salt, a sodium ion sensor is used. The monitoring unit 88 can have various other monitors and sensors according to an application and purpose. For example, although the control device 80 has a plurality of monitoring units 88, and each monitoring unit 88 has one monitor or sensor, a mode of connection between the monitoring unit 88 and the monitor or the sensor is not particularly limited.

The determination unit 86 determines the states of the first filter 70b and the second filter 74b based on the monitoring of the monitoring unit 88.

The control unit 82 controls, for example, opening and closing, or the like of a valve provided in the chemical solution supply system 100 based on the determination of the determination unit 86.

The memory unit 90 stores a threshold value used for the determination of the determination unit 86.

The control device 80 may further have the display unit 92 that displays a monitoring content of the monitoring unit 88, a determination result of the determination unit 86, a content of the control performed by the control unit 82, and a threshold value stored in the memory unit 90.

The control unit 82, the determination unit 86, and the monitoring unit 88 are, for example, electronic circuits. The control unit 82, the determination unit 86, and the monitoring unit 88 are, for example, a computer that is implemented by a combination of hardware such as an arithmetic circuit and software such as a program or programs.

The memory unit 90 includes, for example, a known hard disk drive or semiconductor memory.

The display unit 92 is, for example, a known display.

Figure 4:
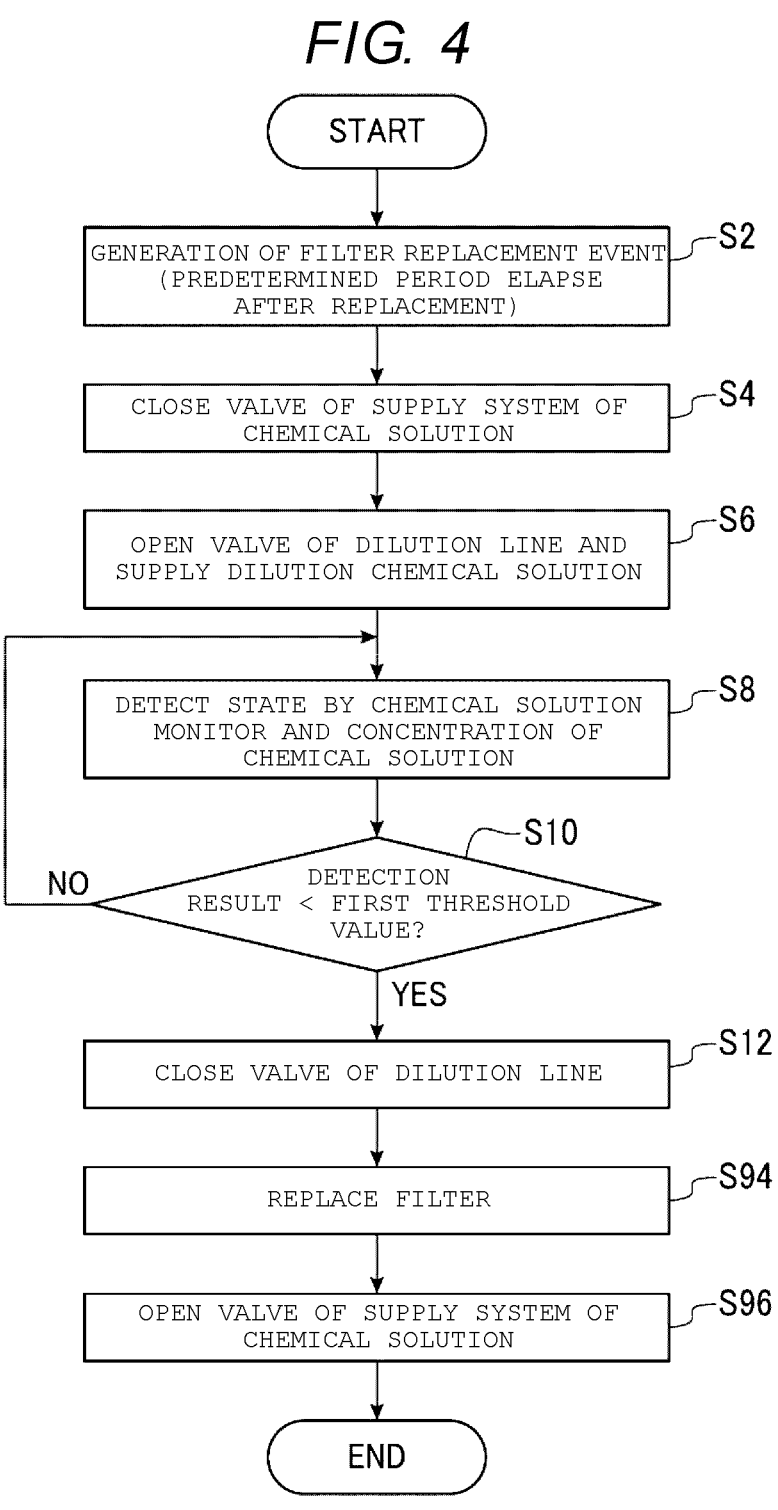
FIG. 4 is a flowchart of a chemical solution supply method of the embodiment.

FIG. 4 is a flowchart of the chemical solution supply method of the embodiment.

Hereinafter, description will be made assuming that the first filter 70b is replaced. When the second filter 74b is replaced, the same procedure can be performed.

First, it is assumed that the filter replacement event generates when the first filter 70b is replaced and a predetermined period elapses (S2).

Next, the valves (first valve 40, second filter unit connection valve 72b, and seventh valve 52) of the supply system of the first chemical solution are closed (S4).

Next, the third valve 44 is opened to supply the second chemical solution from the second tank 4 to the first filter unit 70 via the sixth pipe 20 and the first pipe 10b (S6). Further, the third filter unit connection valve 72c and the ninth valve 56 are opened to supply the chemical solution in the first filter unit 70 to the control device 80. Here, when the second chemical solution is DIW, the first chemical solution is diluted by the second chemical solution.

Next, the monitoring unit 88 measures the concentration of the first chemical solution by using the chemical solution monitor (concentration measurement monitor) (S8).

Next, the determination unit 86 determines whether the concentration of the first chemical solution monitored by the monitoring unit 88 is lower than, for example, the concentration determined by a first threshold value (S10). The first threshold value is an example of the threshold value used for the determination of the determination unit 86.

When the concentration of the first chemical solution is lower than the concentration determined by the first threshold value, the third valve 44, the third filter unit connection valve 72c, and the ninth valve 56 are closed (S12). Next, the first filter 70b is replaced (S94). Next, the valves (first valve 40, second filter unit connection valve 72b, and seventh valve 52) of supply system of the first chemical solution are opened (S96).

On the other hand, when the concentration of the first chemical solution is equal to or greater than the concentration determined by the first threshold value, the steps S8 and S10 described above are repeated to wait until the concentration of the first chemical solution is lower than the concentration determined by the first threshold value.

Figure 5:
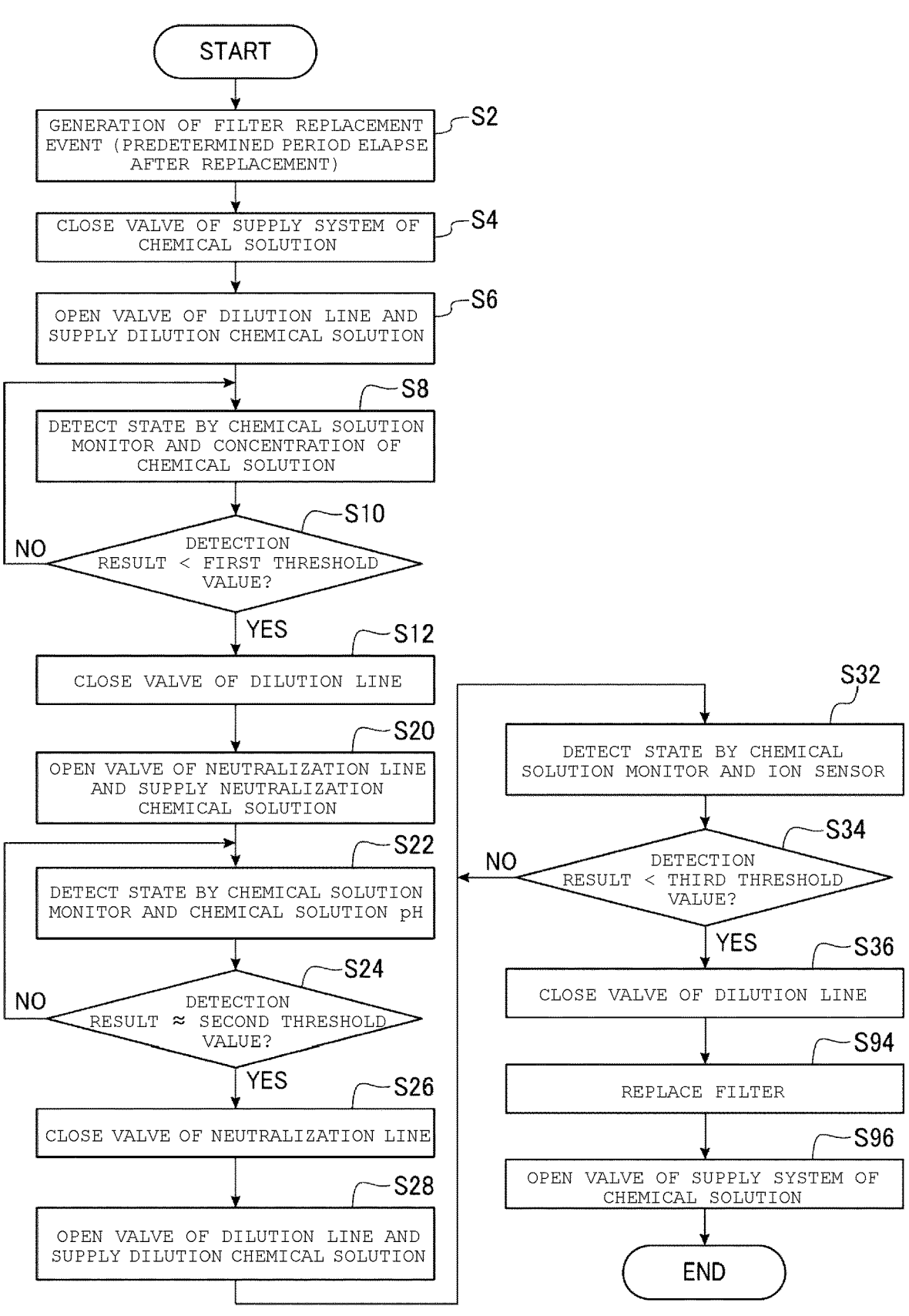
FIG. 5 is a flowchart of a chemical solution supply method of another aspect of the embodiment.

FIG. 5 is a flowchart of a chemical solution supply method of another aspect of the embodiment. When the concentration of the first chemical solution is lower than the concentration determined by the first threshold value, the flowchart is the same as that shown in FIG. 4 up to the point where the third valve 44, the third filter unit connection valve 72c, and the ninth valve 56 are closed (S12).

Next, the sixth valve 50, the fifth valve 48, and the third valve 44 are opened, the third chemical solution is supplied from the third tank 6 to the first filter unit 70 via the eighth pipe 24, the ninth pipe 26, the sixth pipe 20, and the first pipe 10b (S20).

Next, the monitoring unit 88 measures pH of the chemical solution by using a pH monitor (S22).

Next, the determination unit 86 determines whether the pH of the chemical solution measured by the monitoring unit 88 is substantially equal to, for example, what is determined by a second threshold value (S24). The second threshold value is, for example, 7, but is not limited thereto. The second threshold value is an example of the threshold value used for the determination of the determination unit 86.

When the pH of the chemical solution is substantially equal to that determined by the second threshold value, the sixth valve 50, the fifth valve 48, and the third valve 44 are closed (S26). On the other hand, when the pH of the chemical solution is not equal to that determined by the second threshold value, S22 and S24 are repeated to wait until the pH of the chemical solution is substantially equal to that determined by the second threshold value.

Next, the third valve 44 is opened and the second chemical solution is supplied from the second tank 4 to the first filter unit 70 via the sixth pipe 20 and the first pipe 10b (S28).

Next, the monitoring unit 88 measures the ion concentration contained in the chemical solution in the first filter unit 70 by using the ion sensor (S32).

Next, the determination unit 86 determines whether the concentration of the chemical solution measured by the monitoring unit 88 is lower than, for example, the concentration determined by a third threshold value (S34). The third threshold value is an example of the threshold value used for the determination of the determination unit 86.

When the concentration of the chemical solution is lower than the concentration determined by the third threshold value, the third valve 44, the third filter unit connection valve 72c, and the ninth valve 56 are closed (S36). Next, the first filter 70b is replaced (S94). Next, the valves (first valve 40, second filter unit connection valve 72b, and seventh valve 52) of supply system of the first chemical solution are opened (S96).

On the other hand, when the concentration of the chemical solution is equal to or greater than the concentration determined by the third threshold value, the S32 and S34 described above are repeated to wait until the concentration of the chemical solution is lower than the concentration determined by the third threshold value.

Next, effects of the chemical solution supply system and the chemical solution supply method of the embodiment will be described.

Figure 6:
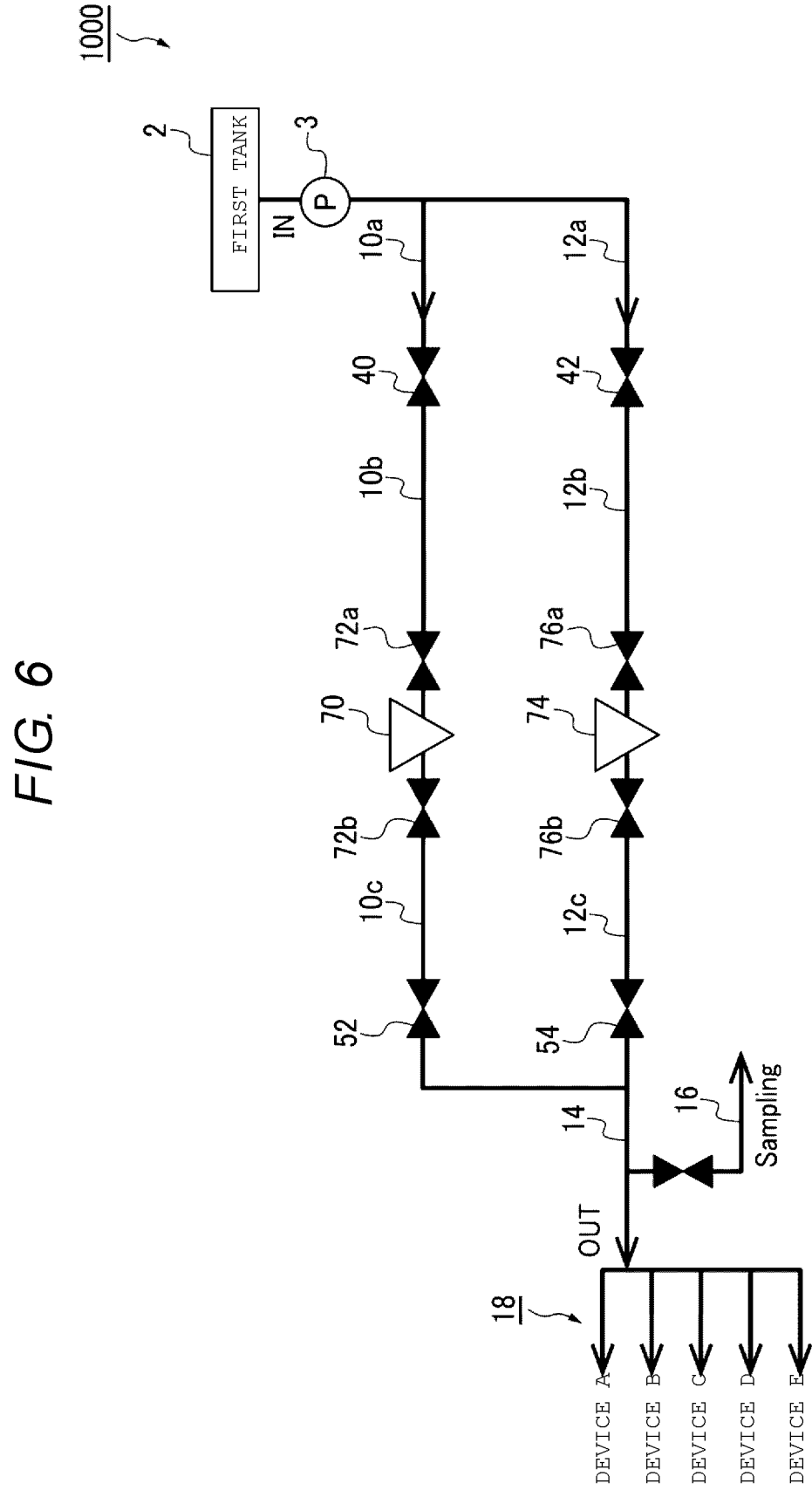
FIG. 6 is a schematic diagram of a chemical solution supply system of a comparative example.

FIG. 6 is a schematic diagram of a chemical solution supply system 1000 as a comparative example. The second tank 4, the third tank 6, and the control device 80 are not provided. Further, the tenth pipe 30 and the ninth valve 56 provided between the first filter unit 70 and the control device 80, and the eleventh pipe 32 and the tenth valve 58 provided between the second filter unit 74 and the control device 80 are not provided. Further, the sixth pipe 20, the seventh pipe 22, the eighth pipe 24, the ninth pipe 26, the third valve 44, the fourth valve 46, the fifth valve 48, and the sixth valve 50 are not provided.

When the non-cartridge type first filter 70b shown in FIG. 2 is replaced, when the first lid 70c is opened and the first filter 70b is taken out, there is a problem that the chemical solution attached to the first filter 70b sticks to protective equipment worn on the hand of a person and a risk of chemical injury occurs. The second filter 74b also has the same problem.

Further, when the cartridge type first filter 70b shown in FIG. 3 is replaced, a situation where the first filter 70b inside the first container 70a comes into direct contact with the protective equipment does not occur. However, since the chemical solution is attached to the first filter unit connection valve 72a, the second filter unit connection valve 72b, and the third filter unit connection valve 72c, there is a problem that a risk of chemical injury occurs. The second filter 74b also has the same problem.

Therefore, the chemical solution supply system of the embodiment includes the first tank that stores the first chemical solution; the first pipe that is connected to the first tank and conveys the first chemical solution; the first filter unit that is connected to the first pipe and has the first filter through which the first chemical solution is filtered; the first valve that is provided in the first pipe between the first tank and the first filter unit; the second tank that stores the second chemical solution; and the second pipe connected to the second tank and the first pipe between the first filter unit and the first valve.

According to this, it is possible to reduce the risk of chemical injury caused by the first chemical solution by using the second chemical solution. Therefore, it is possible to provide the chemical solution supply system in which the filter can be safely used.

When the second chemical solution dilutes the first chemical solution, the filter can be replaced after the first chemical solution in the first filter is diluted by the second chemical solution. Therefore, the possibility of chemical injury can be further reduced.

When the third tank that stores the third chemical solution for neutralizing the first chemical solution is provided, the possibility of chemical injury due to the first chemical solution can be further reduced by such neutralization.

By providing the monitoring unit 88 connected to the first filter unit 70, the liquid in the first filter can be monitored. For example, if the monitoring unit 88 has a concentration measurement monitor for the first chemical solution, it is possible to measure a degree to which the first chemical solution is diluted by the second chemical solution. For example, when the monitoring unit 88 has a pH monitor, it is possible to measure a degree to which the first chemical solution is neutralized by the third chemical solution. For example, when an ion sensor of neutralizing salt, which is generated by neutralization of the first chemical solution and the third chemical solution, is provided, it is possible to measure how much the neutralizing salt ions remain in the first filter. For example, when sodium ions are generated from the neutralizing salt, it is possible to measure how much sodium ions remain in the first filter by using a sodium ion sensor as the ion sensor.

Further, by using the threshold values (first threshold value, second threshold value, and third threshold value) stored in the memory unit 90, such monitoring can be performed with high accuracy and reproducibility.

In the flowchart of the chemical solution supply method of another aspect of the embodiment shown in FIG. 5, after the second chemical solution is supplied (S4), the third chemical solution is supplied (S20), and then the second chemical solution is further supplied (S28) in order to thoroughly remove the ions of the neutralizing salt such as sodium chloride (NaCl) in the semiconductor manufacturing process because they adversely affect the operation of the semiconductor device or the like. That is, the second chemical solution is supplied to lower the concentration of the first chemical solution, and then the third chemical solution is supplied to suppress generation of the neutralizing salt in the first filter.

Further, in the chemical solution supply system 100, two filter units (first filter unit 70 and second filter unit 74) are provided. Therefore, for example, while the filter of one filter unit is replaced, the supply of the chemical solution can be continued using the other filter unit. In this case, it is sufficient to configure one of the first filter unit 70 or the second filter unit 74 such that either the second chemical solution of the second tank 4 or the third chemical solution of the third tank 6 can be supplied. Therefore, in the embodiment, the eighth pipe 24 connected to the third tank 6 is connected to the upstream side of the fourth valve 46 in the seventh pipe 22 connecting the second tank 4 and the first pipe 10a. Further, the ninth pipe 26 connected to the third tank 6 via the eighth pipe 24 is connected to the upstream side of the third valve 44 in the sixth pipe 20 connecting the second tank 4 and the first pipe 10b. The sixth valve 50 and the fifth valve 48 are provided in the eighth pipe 24 and the ninth pipe 26, respectively. On the other hand, no valves are provided upstream of the fourth valve 46 in the seventh pipe 22 and upstream of the third valve 44 in the sixth pipe 20. Therefore, the configuration of the connection portion can be simplified.

According to the chemical solution supply system of the embodiment, it is possible to provide a chemical solution supply system in which the filter can be safely used.

While an exemplary embodiment has been described, the exemplary embodiment has been presented by way of example only, and are not intended to limit the scope of the disclosure. Indeed, the novel embodiment described herein may be embodied in a variety of other forms; furthermore, various omissions, substitutions and changes in the form of the embodiment described herein may be made without departing from the spirit of the disclosure. The accompanying claims and their equivalents are intended to cover such forms or modifications as would fall within the scope and spirit of the disclosure.

What is claimed is:

1. A chemical solution supply system comprising:
a first tank arranged to store a first chemical solution;
a first pipe connected to the first tank, the first pipe being arranged to convey the first chemical solution;
a first filter connected to the first pipe, the first filter being configured to filter the first chemical solution;
a first valve configured to control flow in the first pipe between the first tank and the first filter;
a second tank arranged to store a second chemical solution;
a second pipe connected to the second tank and the first pipe between the first filter and the first valve;
a third tank arranged to store a third chemical solution that neutralizes the first chemical solution;
a third pipe connected to the third tank and the first pipe between the first filter and the first valve;
a monitor connected to the first filter, the monitor being configured to monitor a state of a liquid in the first filter; and
a controller configured to determine a state of the first filter based on the monitoring by the monitor,
wherein the controller is configured to neutralize the first chemical solution by (i) closing the first valve and opening the second pipe to supply the second chemical solution into the first filter until a concentration threshold is satisfied; (ii) opening the third pipe to supply the third chemical solution into the first filter until a pH threshold is satisfied, wherein a neutralizing salt is generated by neutralization of the first chemical solution and the third chemical solution; (iii) opening the second pipe to supply the second chemical solution into the first filter until an ion-concentration threshold for the neutralizing salt is satisfied; and then (iv) replacing the first filter.

2. The chemical solution supply system according to claim 1,
wherein the second chemical solution dilutes the first chemical solution.

3. The chemical solution supply system according to claim 1, further comprising:
a memory configured to store one or more values of at least one of the concentration threshold, the pH threshold, or the ion-concentration threshold, used for the monitoring.

4. The chemical solution supply system according to claim 1, wherein the first filter includes a cartridge type filter.

5. The chemical solution supply system according to claim 1, wherein:
the monitor is configured to monitor at least one of a plurality of state parameters of the state of the liquid in the first filter.

6. The chemical solution supply system according to claim 5, wherein the plurality of state parameters include concentration, pH, or ions of the liquid inside the first filter.

7. The chemical solution supply system according to claim 5, wherein the controller is configured to determine the state of the first filter based on a value of at least one of the plurality of state parameters relative to a threshold.

8. The chemical solution supply system according to claim 7, wherein the controller is configured to determine whether or not the first filter should be replaced based on the determined state.

9. The chemical solution supply system according to claim 5, wherein the controller is configured to determine the state of the first filter based on a value of two or more of the plurality of state parameters relative to a threshold.

10. The chemical solution supply system according to claim 9, wherein the controller is configured to determine whether or not the first filter should be replaced based on the determined state.

11. A chemical solution supply method comprising:
supplying a first chemical solution from a first tank, via a first pipe, to a first filter that filters the first chemical solution;
closing a first valve that is disposed in the first pipe between the first tank and the first filter;
supplying a second chemical solution from a second tank to the first filter, via a second pipe connected to the second tank and the first pipe between the first filter and the first valve, and the first pipe;
supplying a third chemical solution from a third tank to the first filter, via a third pipe connected to the third tank and the first pipe between the first filter and the first valve, and the first pipe, wherein the third chemical solution neutralizes the first chemical solution;
monitoring, by a monitor connected to the first filter, a state of a liquid in the first filter;
determining, by a controller, a state of the first filter based on the monitoring by the monitor; and
neutralizing the first chemical solution by (i) closing the first valve and opening the second pipe to supply the second chemical solution into the first filter until a concentration threshold is satisfied; (ii) opening the third pipe to supply the third chemical solution into the first filter until a pH threshold is satisfied, wherein a neutralizing salt is generated by neutralization of the first chemical solution and the third chemical solution; (iii) opening the second pipe to supply the second chemical solution into the first filter until an ion-concentration threshold for the neutralizing salt is satisfied; and then (iv) replacing the first filter.

12. The method according to claim 11,
wherein the second chemical solution dilutes the first chemical solution.

13. The chemical solution supply system according to claim 1, further comprising:
an ion sensor configured to measure concentration of ions in the neutralizing salt that is generated by neutralization of the first chemical solution and the third chemical solution.

14. The chemical solution supply system according to claim 1, wherein the first filter includes:

a first cylindrical container;

a first cartridge type filter placed in the cylindrical container; and a first lid attached to the cylindrical container.

\* \* \* \* \*